United States Patent
Gilles

(10) Patent No.: US 12,005,977 B2
(45) Date of Patent: Jun. 11, 2024

(54) CONTINUOUS TRACK ATTACHMENT ASSEMBLY

(71) Applicant: Arthur T. Gilles, Saginaw, MI (US)

(72) Inventor: Arthur T. Gilles, Saginaw, MI (US)

( * ) Notice: Subject to any disclaimer, the term of this patent is extended or adjusted under 35 U.S.C. 154(b) by 0 days.

(21) Appl. No.: 18/100,064

(22) Filed: Jan. 23, 2023

(65) Prior Publication Data

US 2023/0234652 A1 Jul. 27, 2023

Related U.S. Application Data

(60) Provisional application No. 63/302,334, filed on Jan. 24, 2022.

(51) Int. Cl.
| | | |
|---|---|---|
| *B62D 55/15* | (2006.01) | |
| *A61G 5/06* | (2006.01) | |
| *B62D 55/02* | (2006.01) | |
| *B62D 55/10* | (2006.01) | |
| *B62D 55/14* | (2006.01) | |
| *B62D 55/24* | (2006.01) | |

(52) U.S. Cl.
CPC ............. *B62D 55/15* (2013.01); *A61G 5/066* (2013.01); *B62D 55/10* (2013.01); *B62D 55/14* (2013.01); *B62D 55/02* (2013.01); *B62D 55/244* (2013.01)

(58) Field of Classification Search
CPC ........ B62D 55/02; B62D 55/10; B62D 55/14; B62D 55/15; B62D 55/244; A61G 5/066
See application file for complete search history.

(56) References Cited

U.S. PATENT DOCUMENTS

| | | | | |
|---|---|---|---|---|
| 1,062,318 A | * | 5/1913 | Berlin ..................... | B60B 19/00 305/126 |
| 1,298,022 A | * | 3/1919 | Dickerson ............ | B62D 55/108 305/134 |
| 1,298,444 A | * | 3/1919 | Boissiere ............... | B62D 55/08 180/321 |
| 1,870,632 A | * | 8/1932 | Kennedy ................ | B62D 55/02 180/6.7 |
| 4,103,558 A | * | 8/1978 | Peabody ................. | F16H 55/36 474/197 |
| 4,960,180 A | | 10/1990 | Livingston | |

(Continued)

FOREIGN PATENT DOCUMENTS

| | | | | |
|---|---|---|---|---|
| CA | 2574729 A1 | * | 7/2007 | ............. B62D 55/04 |
| FR | 3034743 A3 | * | 10/2016 | |

*Primary Examiner* — Kip T Kotter
(74) *Attorney, Agent, or Firm* — Reising Ethington PC

(57) ABSTRACT

A continuous track attachment assembly adapted be used on conveying equipment is disclosed. The assembly includes a pair of spaced apart side plates having a plurality of wheel mounting openings therethrough. The side plates have a frame connection opening therethrough. The assembly further includes a plurality of support wheels disposed between the side plates, each of the support wheels including a wheel axle receiving opening therethrough. A center support wheel has a diameter that may be greater than the diameter of two outer support wheels. The assembly further comprises an axle disposed through the wheel mounting openings of the side plate and through the shaft receiving openings of the support wheels to thereby support the support wheels between the side plates while allowing rotation of the support wheels. The assembly further comprises a continuous track disposed about the support wheels.

13 Claims, 8 Drawing Sheets

(56) References Cited

U.S. PATENT DOCUMENTS

| | | | |
|---|---|---|---|
| 6,076,619 A | 6/2000 | Hammer | |
| 2007/0029877 A1* | 2/2007 | Longley | B65G 7/02 |
| | | | 305/120 |
| 2009/0095544 A1* | 4/2009 | Carlson | B60K 17/16 |
| | | | 180/6.48 |
| 2011/0241410 A1* | 10/2011 | Tan | B62B 9/00 |
| | | | 301/5.1 |
| 2013/0153308 A1* | 6/2013 | Underwood | A61G 5/128 |
| | | | 180/6.7 |
| 2015/0251714 A1* | 9/2015 | Guigan | B62B 5/02 |
| | | | 180/9.1 |

* cited by examiner

CONTINUOUS TRACK ATTACHMENT ASSEMBLY

TECHNICAL FIELD

The disclosure relates to a continuous track attachment assembly for conveying equipment.

BACKGROUND

Conveying equipment, such as a wheelchair or a walker typically contain wheels for facilitating movement of the conveying equipment and person using the conveying equipment. The wheels are typically part of an assembly that is attached to the forward portion of the conveying equipment. The wheel assemblies often include a frame, having a shaft with the wheel supported by the frame. The wheel assemblies are attached to the conveying equipment by a shaft rotatably retained in a receiver in the conveying equipment. The wheel assembly attached in such a manner allows the wheel assembly to rotate so that the conveying equipment can be turned more easily. In some instances, the wheel of the conveying equipment which also rotates relative to the frame may encounter an impediment that stops the wheel from rotating, such as by encountering a rock or a rut. In some instances, this could cause the wheel to stop turning which in turn may cause the conveying equipment to tip, presenting a hazardous situation for the user of the conveying equipment. It would be desirable to provide an attachment for the conveying equipment that aids in reducing this from happening.

SUMMARY

In one embodiment there is provided a continuous track attachment assembly adapted be used on conveying equipment. The continuous track attachment assembly comprises a pair of spaced apart side plates having a plurality of wheel mounting openings therethrough. The side plates further have a frame connection opening therethrough. The assembly further comprises a plurality of support wheels disposed between the side plates. Each of the support wheels includes a shaft receiving opening therethrough. The assembly further comprises an axle disposed through the wheel mounting openings of the side plate and through the shaft receiving openings of the support wheels to thereby support the support wheels between the side plates while allowing rotation of the support wheels. The assembly further comprises a continuous track disposed about the support wheels.

DETAILED DESCRIPTION

Figure 1:
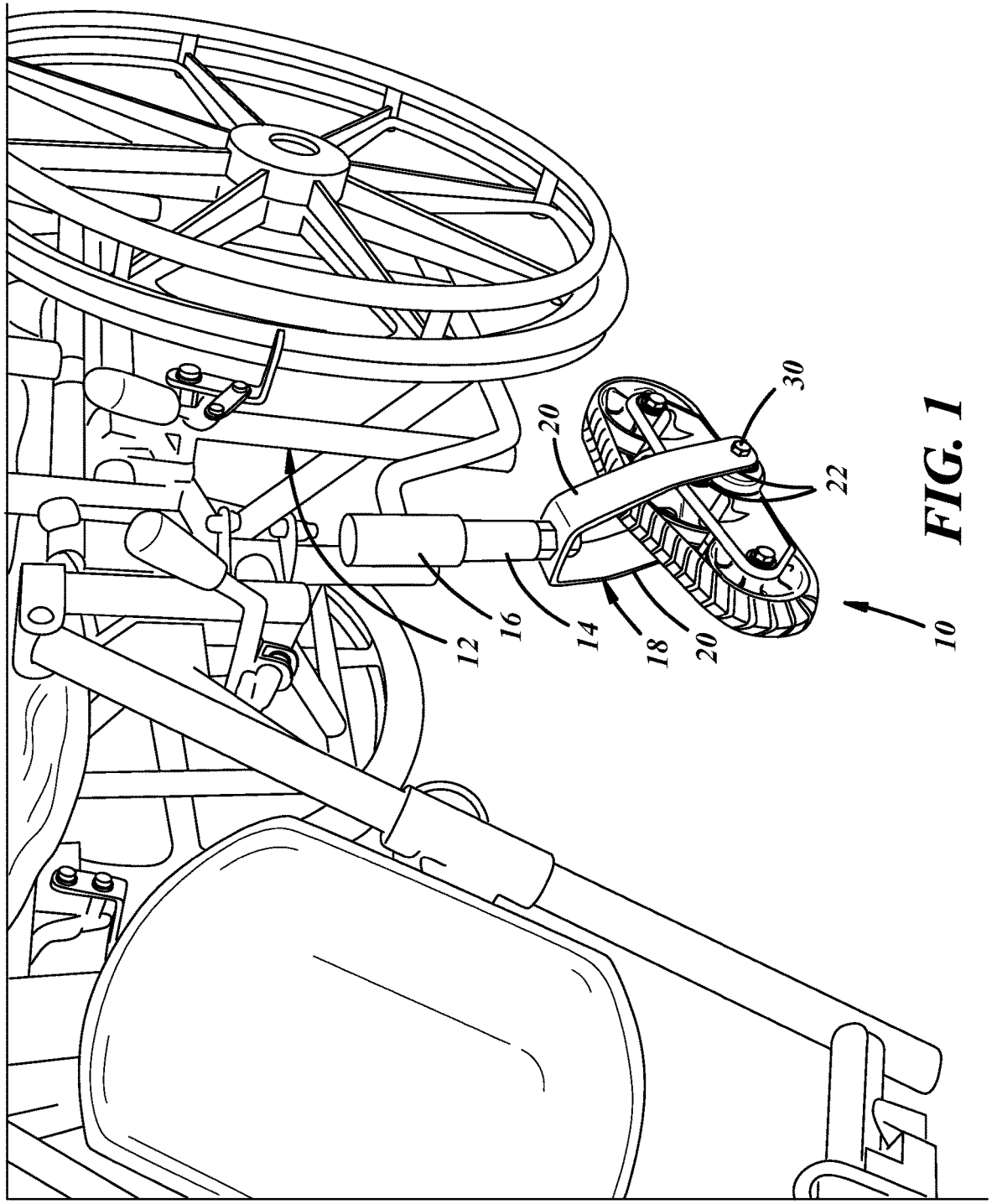
FIG. 1 is a perspective view of an embodiment of the continuous track attachment assembly attached to conveying equipment.

Embodiments of a continuous track attachment assembly, hereafter sometimes referred to as "the assembly 10" are shown in the figures. The embodiments shown herein are the same except for the configuration of the side plates. Accordingly, each common feature among the embodiments will be given the same reference numeral throughout the drawings and the side plates will be given the same numeral with a prime to indicate the alternate.

A continuous track attachment assembly is generally indicated at 10. As shown in FIG. 1, the assembly 10 is adapted to be connected to a conveying device, generally shown at 12. As shown, the conveying device 12 is a wheelchair. It will be appreciated that the assembly 10 can be connected to other conveying devices, such as walkers or gurneys, not shown. As shown in FIG. 1, the assembly 10 attaches to the conveying device 12 and replaces the front wheel of the conveying device 12. It will be appreciated that in other embodiments, the assembly can be used to replace rear wheel or bot the front and rear wheels of the conveying device. In the embodiment shown, a shaft 14 is rotatably disposed in a receiver 16 to allow relative rotation between the shaft 14 and receiver 16, thereby allowing the assembly 10 to rotate relative to the remainder of the conveying device which may allow the conveying equipment to turn easier. A fork assembly 18 is connected to and depends from the shaft 14. The fork assembly 18 contains a pair of depending legs 20 that are spaced apart. Each of the legs 20 include at least one hole 22 that is used to mount to the assembly 10.

Figure 2:
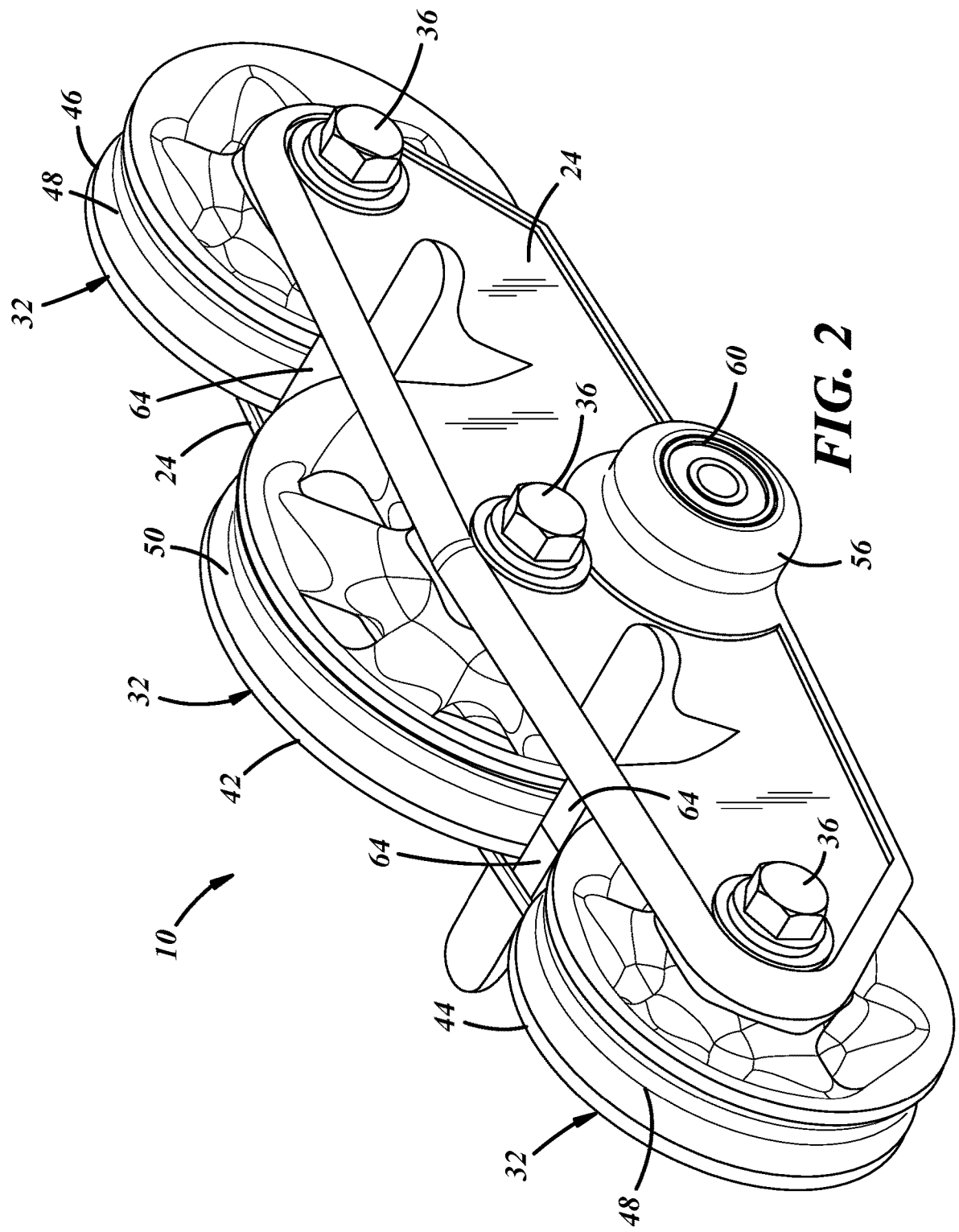
FIG. 2 is a perspective view of an embodiment of the continuous track attachment assembly without the track.
Figure 3:
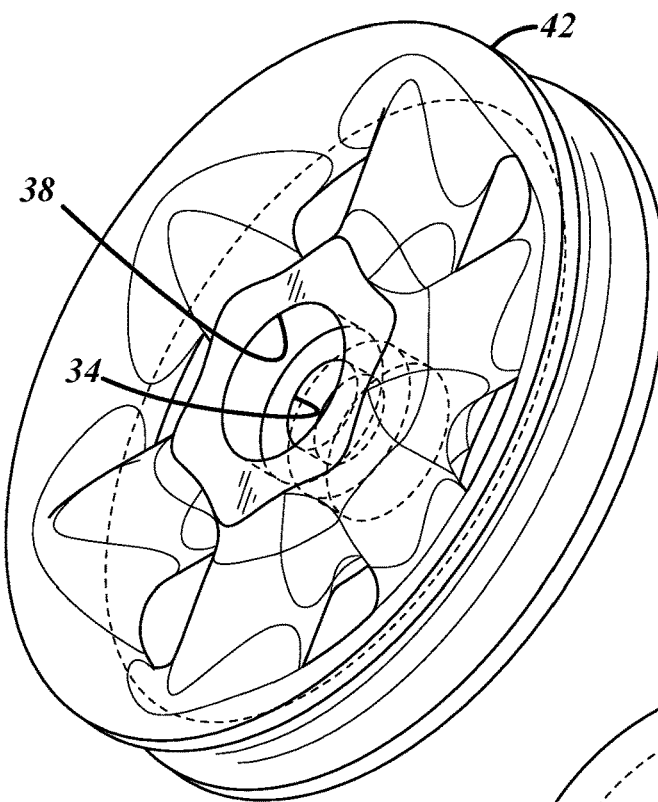
FIG. 3 is a perspective view of a center wheel of an embodiment of the continuous track attachment assembly.
Figure 4:
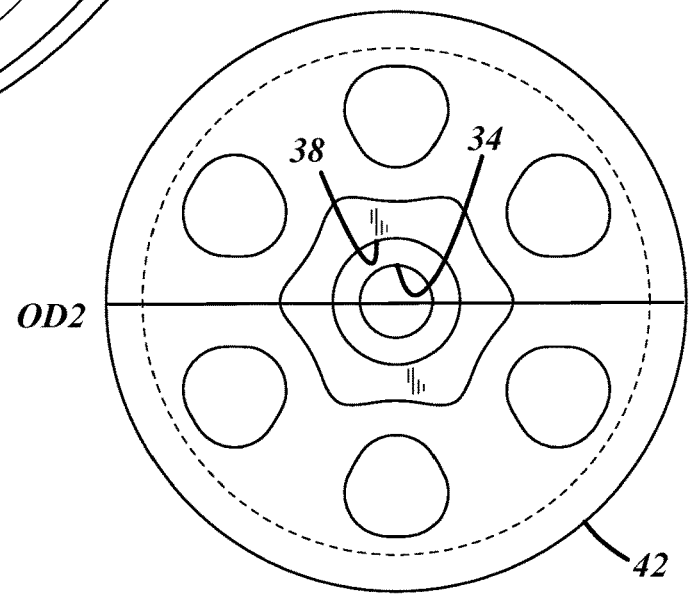
FIG. 4 is a side view of a center wheel of an embodiment of the continuous track attachment assembly.
Figure 5:
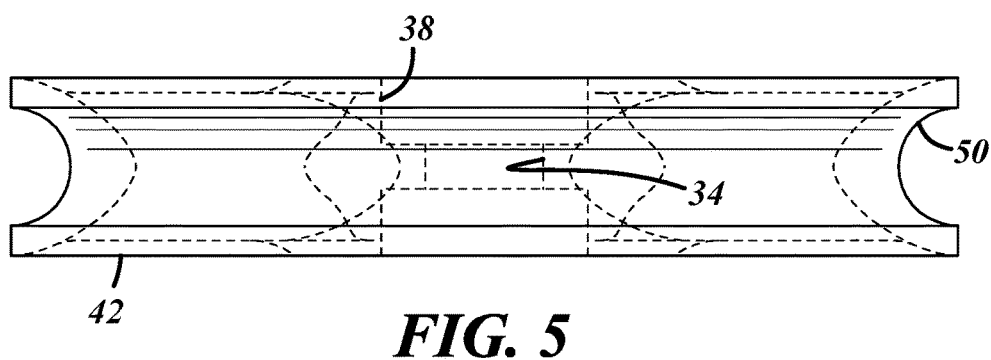
FIG. 5 is a top view of a center wheel of an embodiment of the continuous track attachment assembly.
Figure 14:
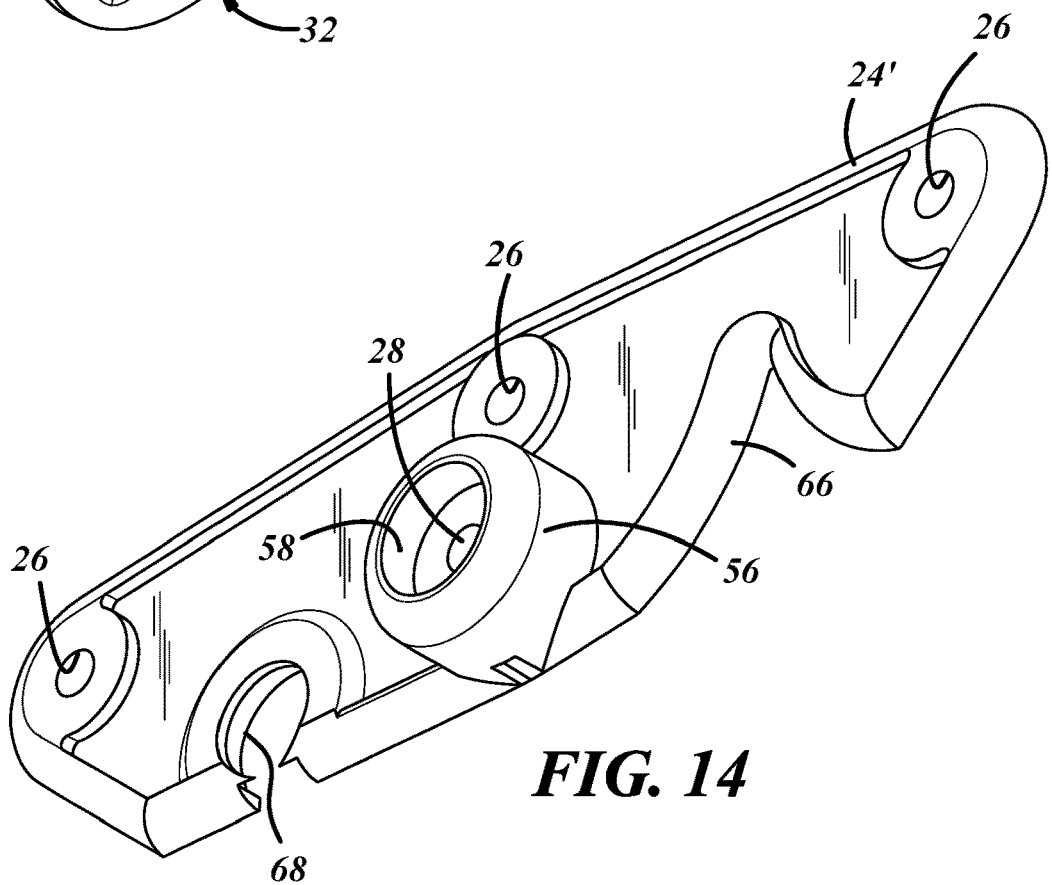
FIG. 14 is a perspective view of a side plate of an embodiment of the continuous track attachment assembly.
Figure 15:
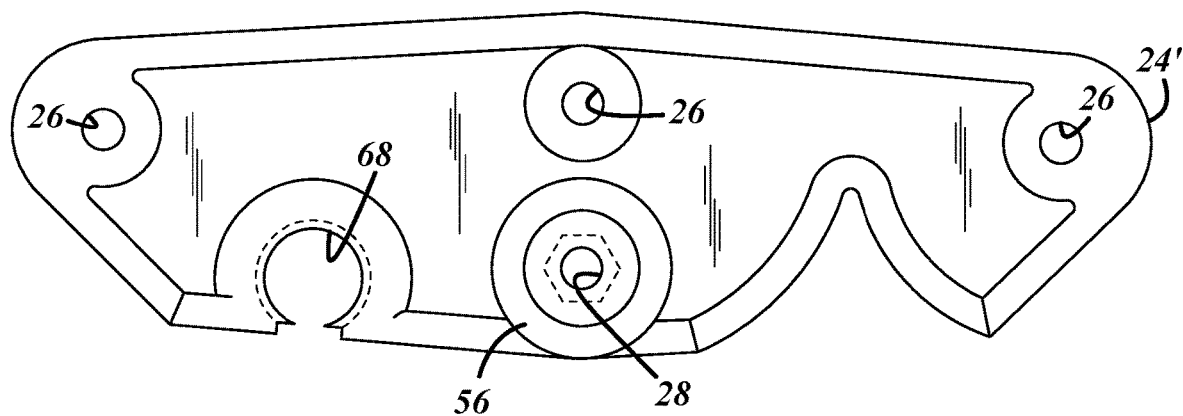
FIG. 15 is a side view of a side plate of an embodiment of the continuous track attachment assembly.
Figure 16:
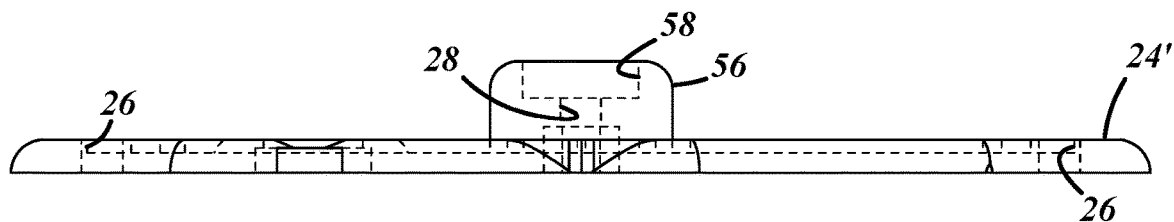
FIG. 16 is an end view of a side plate of an embodiment of the continuous track attachment assembly.
Figure 17:
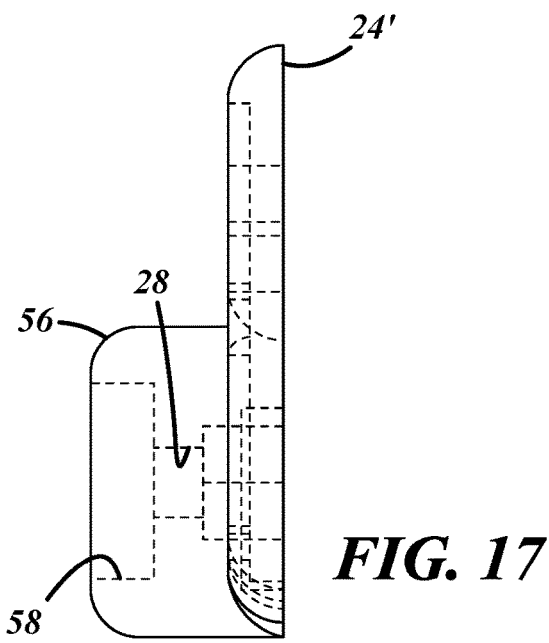
FIG. 17 is a top view of a side plate of an embodiment of the continuous track attachment assembly.

As shown in FIG. 2, the assembly 10 includes a pair of side plates 24. Another embodiment of the side plates 24' is shown in FIGS. 14-16. The side plates 24, 24' are spaced apart and include a plurality of wheel mounting openings therethrough 26, as best seen in FIGS. 14 and 15. The side plates 24, 24' have a frame connection opening 28 therethrough as best seen in FIGS. 14-17. The frame connection openings 28 are adapted to receive an axle 30. In the embodiments shown, the axle 30 comprises a bolt. It will be appreciated that any suitable axle may be used. A nut, not shown, secures the axle 30.

The assembly 10 includes a plurality of support wheels generally indicated at 32 rotatably disposed between the side plates 24, 24'. Each of the support wheels 32 includes a wheel axle receiving opening 34 therethrough. The support wheels 32 are rotatable with respect to the side plates 24, 24' about a wheel axle 36. In the embodiments shown, the wheel axle 36 comprises a bolt that is received in the wheel axle receiving openings 34. It will be appreciated that any suitable axle may be used. For example, the axle may be a clevis pin or the like. The axle may alternatively be molded into one or both of the side plates 24, 24'.

Figure 6:
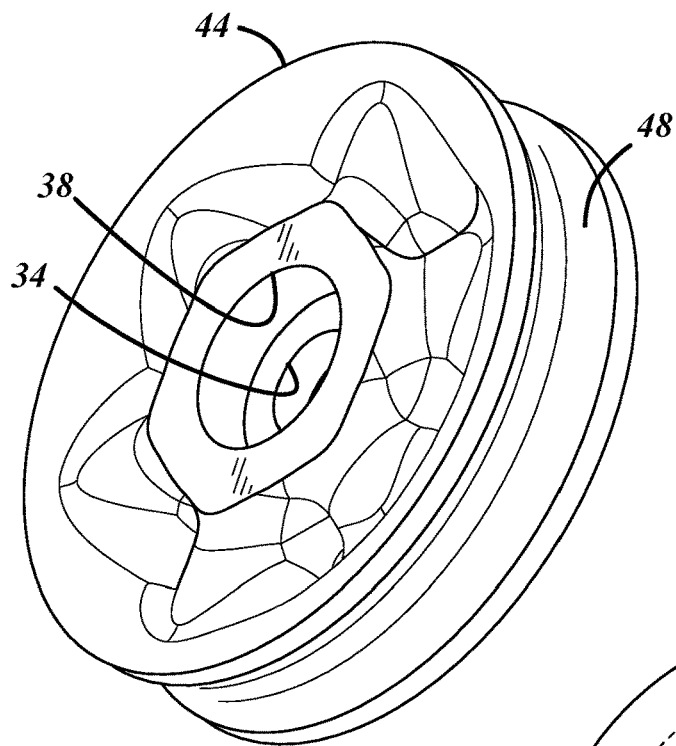
FIG. 6 is a perspective view of a support wheel of an embodiment of the continuous track attachment assembly.
Figure 7:
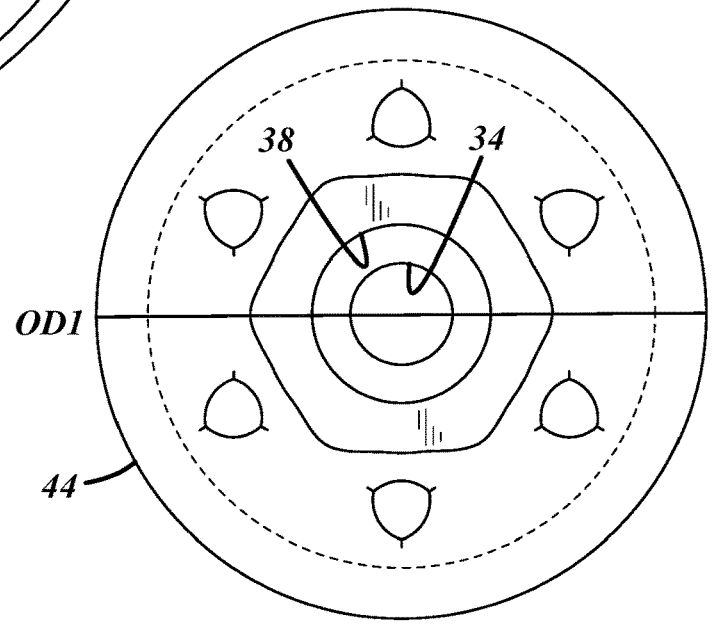
FIG. 7 is a side view of a support wheel of an embodiment of the continuous track attachment assembly.
Figure 8:
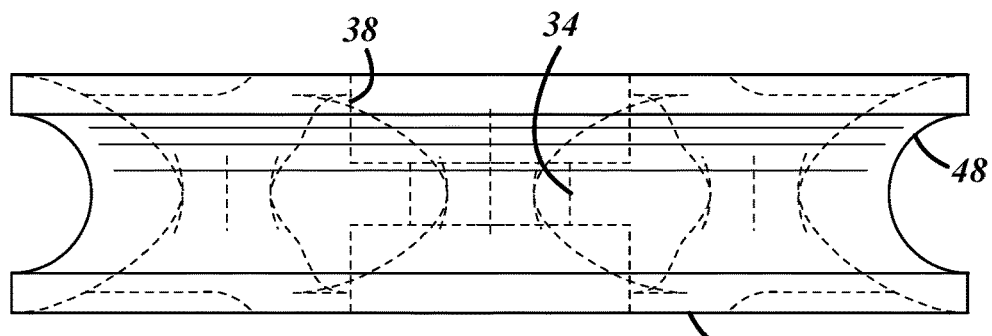
FIG. 8 is a top view of a support wheel of an embodiment of the continuous track attachment assembly.
Figure 12:
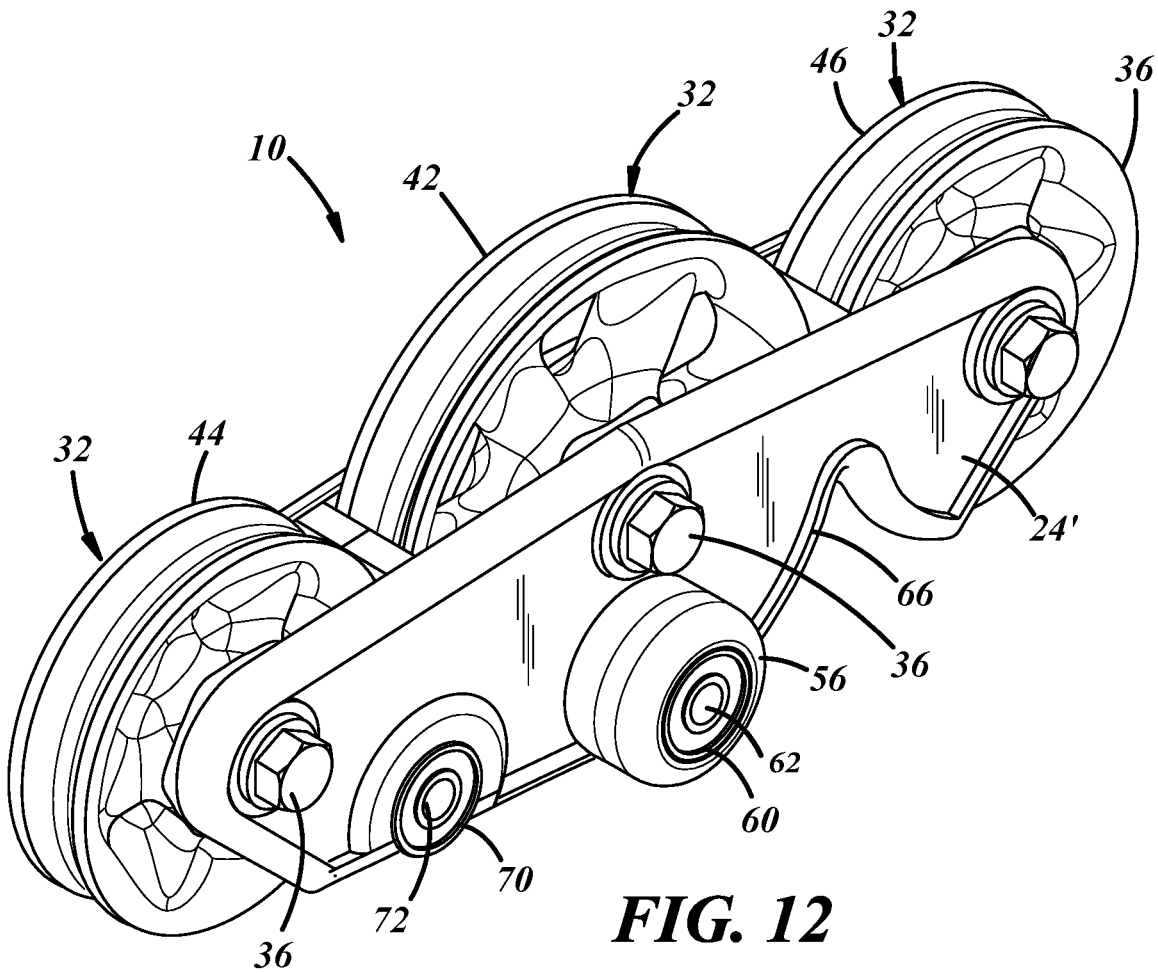
FIG. 12 is a perspective view of an embodiment of the continuous track attachment assembly without the track.
Figure 13:
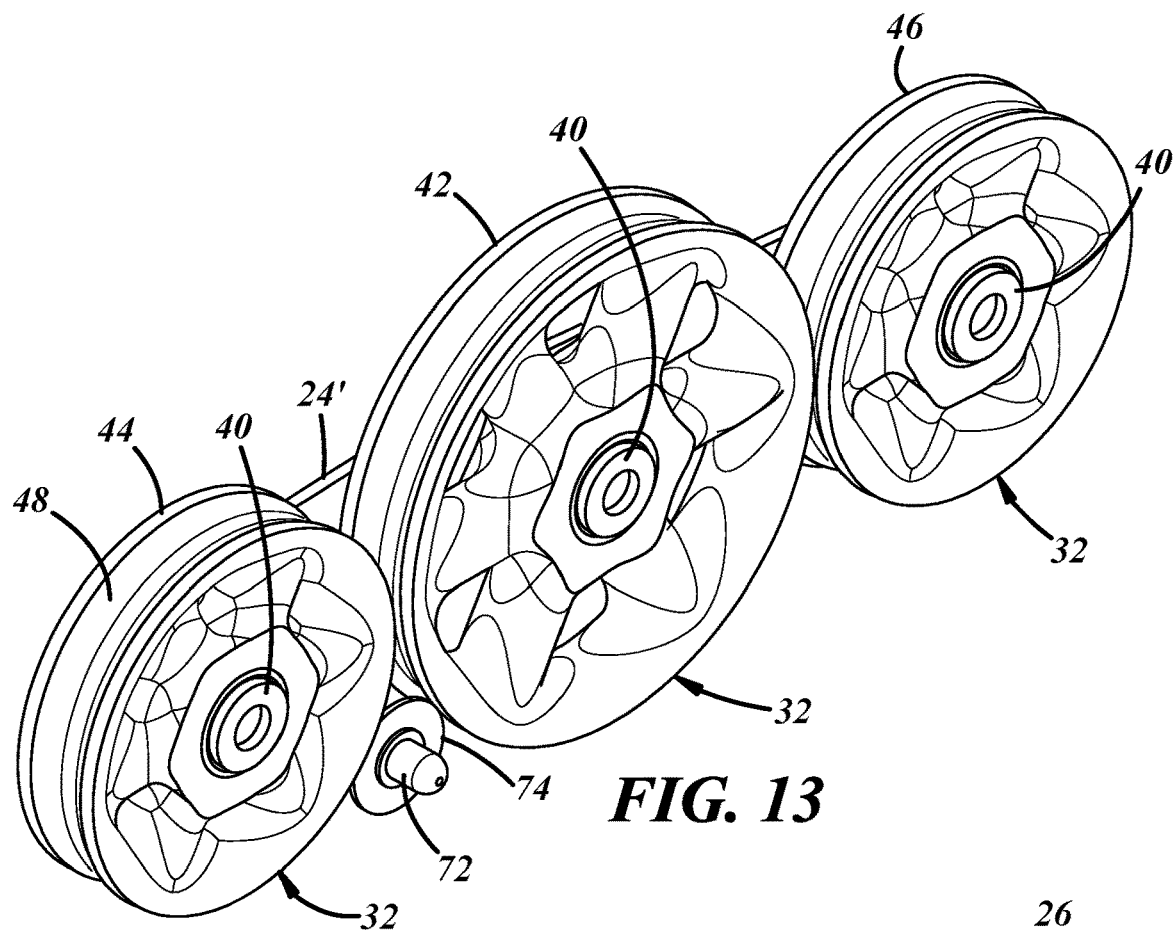
FIG. 13 is a perspective view of an embodiment of the continuous track attachment assembly without one side plate and without the track.

Each support wheel 32 may include a wheel bearing receiving pocket 38. In some embodiments, each support wheel 32 has a pair of wheel bearing receiving pockets 38 on opposite sides of the respective support wheel 32. Wheel bearings 40 may be disposed in the wheel bearing receiving pockets 38, as best seen in FIG. 13. The support wheels 32 may comprise a center wheel 42 and a first wheel 44 and second wheel 46. The first wheel 44 and second wheel 46 may be located on each side of the center wheel 42 as best seen in FIGS. 12 and 13. In an embodiment, the first wheel 44 and second wheel 46 have the same configuration. The configuration of the first wheel 44 and second wheel 46 is shown best in FIGS. 6-8. While only one of the first wheel 44 and second wheel 46 is shown in FIGS. 6-8, the description herein of the configuration of the first wheel 44 and second wheel 46 is the same. The first wheel 44 and second wheel 46 each have a periphery defining an outer diameter OD1. The center wheel 42 has a periphery defining an outer diameter OD2. In an embodiment the outer diameter OD2 of the center wheel 42 is greater than the outer diameter OD1 of the first wheel 44 and second wheel 46. The center wheel 42, when attached between the side plates 24, 24' has its periphery both above and below the periphery of the first wheel 44 and the second wheel 46, as best seen in FIG. 13.

The first wheel 44 and second wheel 46 each have a concave outer surface 48 as best seen in FIGS. 6 and 8. The center wheel 42 also has a concave outer surface 50. The concave surfaces 48 of each of the first wheel 44 and second wheel 48 and the concave surface 50 of the center wheel are to receive a continuous track, generally indicated at 52, therein as seen in FIG. 1.

Figure 9:
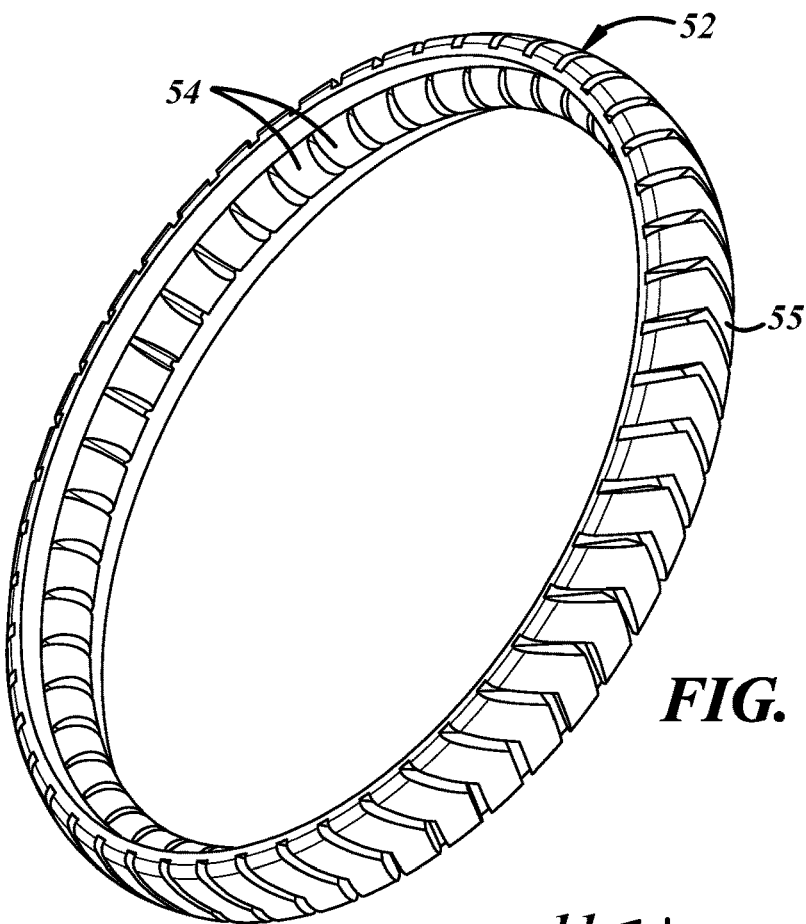
FIG. 9 is perspective view of a continuous belt of an embodiment of the continuous track attachment assembly.
Figure 10:
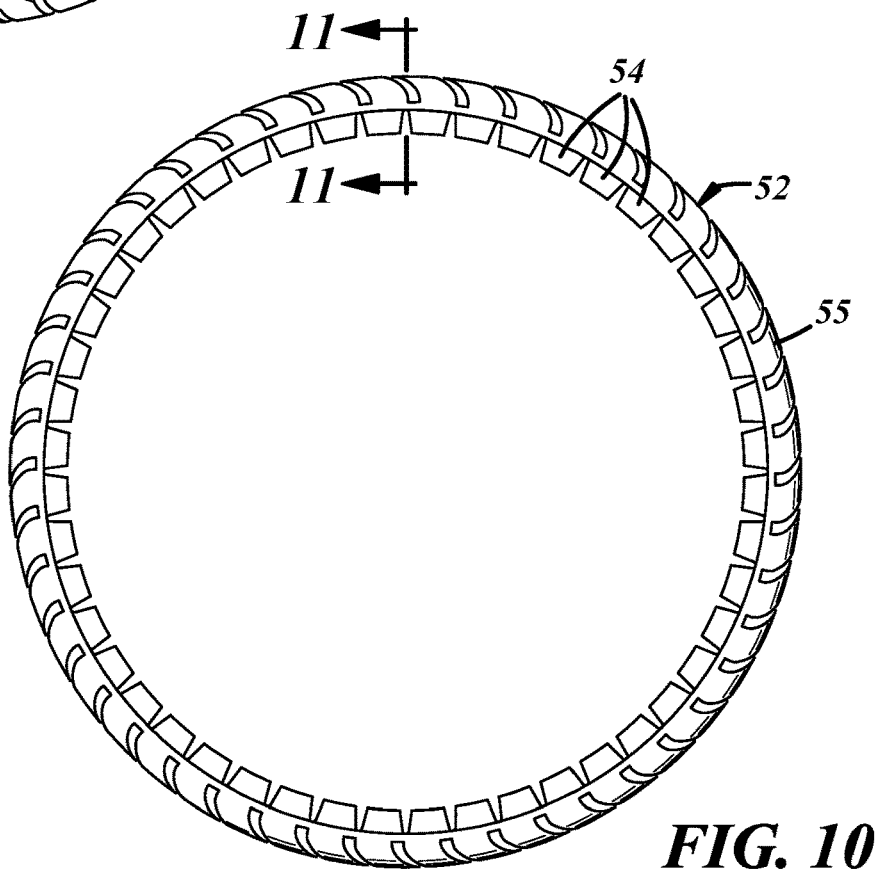
FIG. 10 is a side view of a continuous belt of an embodiment of the continuous track attachment assembly.
Figure 11:
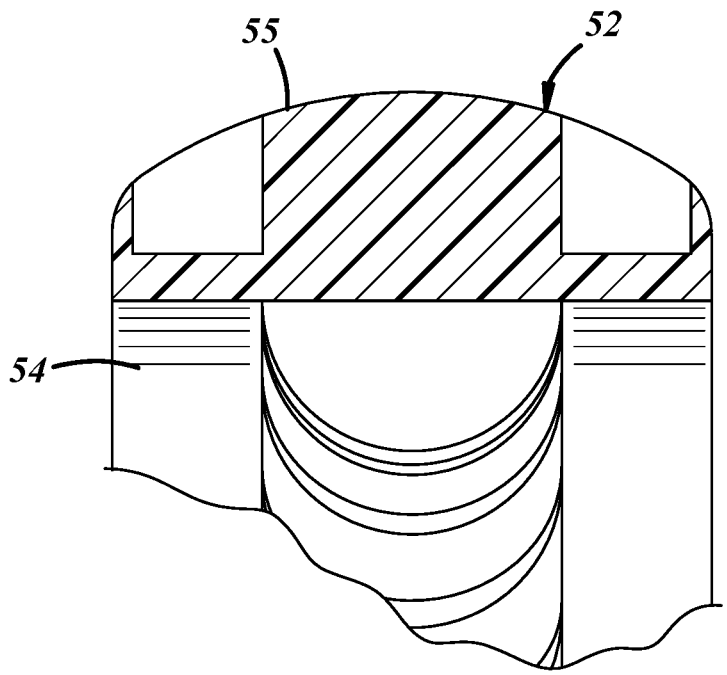
FIG. 11 is a cross sectional view of a continuous belt of an embodiment of the continuous track attachment assembly taken along lines A-A of FIG. 10.

An embodiment of a continuous track 52 is best seen in FIGS. 9-11. In this embodiment, the track has an inner portion having a plurality of teeth 54. The teeth 54 may help the continuous track 52 flex and also may help the continuous track 52 grip the first and second concave outer surfaces 48 of the first wheel 44 and second wheel 46, respectively, and the center concave out surface 50 of the center wheel 42. It will be appreciated that the continuous track 52 may not include teeth 54, or may include another surface configuration that may help the continuous track 52 to flex or grip the concave surfaces 48 and 50 of the respective support wheels 32. The continuous track also has an outer portion 55 which may include a tread. In an embodiment, the tread may comprise a chevron shape. The tread may help the continuous track 52 grip the surface on which the assembly 10 may be used. It will be appreciated that the tread may take any suitable configuration or may be eliminated in some embodiments.

As best seen in FIG. 1, the continuous track 52 is disposed within the concave surfaces 48 of each of the first wheel 44 and second wheel 48 and the concave surface 50 of the center wheel 42. As a result of the larger outside diameter OD2 of the center wheel 42, the continuous track 52, when placed about the center wheel 42, the first wheel 44 and the second wheel 46 forms a generally V-shape on the top and bottom of the assembly 10. That is, the continuous track forms an apex both above and below the center wheel 42. In this manner, the continuous track 52, during normal use of the conveying equipment 12 engages the ground, or other contact surface, with a relatively smaller portion of the continuous track 52 than if the center wheel 42, first wheel 44 and second wheel 46 had all of the periphery surfaces aligned toward the direction of the ground. This configuration may also reduce the force needed to move the continuous track 52 and thereby the conveying equipment 12 and also may form a pivot point for the assembly 10 when the conveying equipment 12 is turned. Further, this arrangement may allow the side plates 24, 24' to pivot about the axle 30, which may allow an additional portion of the continuous track 52 to engage the ground. In some instances this may provide more stability to the conveying equipment 12.

Turing again to the description of the side plates 24, and 24', each of the side plates 24, 24' may include a boss 56 extending outwardly therefrom. The boss 56 defines a pocket 58. The pocket 58 is for receiving a bearing 60 as best seen in FIG. 12. The bearing 60 has an opening 62 therethrough that aligns with the frame connection openings 28 through the side plates 24, 24'. The axle 30 passes through the opening 62. The bearing 60 allows for relative pivoting movement between the fork assembly 18 and the assembly 10 during use of the conveying equipment 12. That is, the side plates 24, 24' that include the support wheels 32 therebetween can pivot relative to the fork assembly 18 to thereby allow more or less of the continuous track 52 to engage the surface on which the conveying equipment 12 is being used.

It has been found that in some operation of the conveying equipment 12 with the assembly 10 attached, a force may be applied to the side plates 24, 24' that causes them to pinch, which may result in the side plates 24, 24' engaging the continuous track. This may bind the continuous track 52 which is undesirable. The assembly 10 may include one or more ways to inhibit pinching of the side plates 20, 24'. In an embodiment, side plate 24, as best seen in FIG. 2, includes spacers, 64. The spacers 64 of opposite side plates 24 may engage one another. This may help prevent the side plates 24 from pinching during use of the conveying equipment and causing a binding of the assembly 10. FIG. 12 shows an alternate side plate 24' that depicts alternate ways to help alleviate any pinching of the side plates 24'. In one embodiment, the side plates 24' include a notch 66. The notch 66 extends in such a way so as to reduce any potential pinch point by eliminating an area of the side plate 24' in the area of a potential pinch point. As best seen in FIG. 12, yet another alternate embodiment is shown that may help in alleviating a potential pinch point. As shown in FIGS. 12 and 14, each side plate 24' may include a pocket for receiving a bearing 70. A spindle 72, best seen in FIG. 13, extends between the side plates 24'. The spindle 72 includes a pair of shoulders 74 that may engage the inner surface of the respective side plates 24' to maintain spacing of the side plates 24' and may help alleviate any pinching. The spindle 72 may be carried by the bearings. More specifically, the end of the spindle 72 may extend into the bearings on opposite side plates 24' as shown in FIG. 12.

The embodiments shown in FIGS. 12 and 14 include alternate ways to alleviate any issues associated with pinching of the side plates 24' within the same side plate 24' as discussed above. It will be appreciated that the side plates 24 may include only one of the methods to alleviate issues associated with pinching of the side plates 24'. For example, the side plate 24' may have two notches 66, one as shown and a second in the area where the pocket 68 for receiving the bearing 70 is shown. This embodiment thus eliminates the respective bearing 70 and spindle 72. In another example, the notch 66 can be replaced by a second pocket 68 and bearing 70 having a spindle 72. This embodiment thus eliminates the notch 66. It will be appreciated that one or more of these ways discussed in connection with side plates 24, 24' to help alleviate pinching of the side plates 24, 24' may be used singularly or together. It will also be appreciated that in some embodiments, there is no need to implement any of these ways and they may not be used.

The assembly 10 may be constructed as follows. A pair of side plates 24, 24' having the boss 56 are used. A bearing 60 is placed in the pocket 58 of each respective boss 56. A center wheel 42 is provided. A wheel bearing 40 is placed in the wheel bearing receiving pockets 38 on each side of the center wheel 42. A first wheel 44 and a second wheel 46 are provided. A wheel bearing 40 is placed in the wheel bearing receiving pockets 38 on each side of the first wheel 44 and the second wheel 46.

An axle 36, in an embodiment a bolt, is inserted through each of the wheel frame mounting openings in one of the side plates 24, 24'. Each of the center wheel 42 and first wheel 44 and second wheel 46 are disposed on their respective axles 36. The center wheel 42 is positioned between the first wheel 44 and the second wheel 46, such that the axle 36 passes through the respective wheel bearings 40. The second side plate 24, 24' is positioned on the axles 36. A retainer, such as a nut, not shown, is then secured to the axle 36. When this connection is made, the center wheel 42, first wheel 44 and second wheel 46 are rotatably retained between the side plates 24, 24'. The continuous track 52 is positioned in the first and second concave outer surfaces 48 of the first wheel 44 and second wheel 46 as well as the center concave outer surface 50 of the center wheel 42. Since the outer diameter OD2 of the center wheel 42 is larger than the outer diameter OD1 of the first and second wheels, the continuous track forms a generally V-shape, having an apex above and below the center wheel 42.

In an embodiment, as best shown in FIGS. 12-13, a bearing 70 may be placed in the pocket 68 in each of the side plates 24'. A spindle 72 is positioned between the side plates 24' with a portion of the spindle 72 extending into the bearings 70. The shoulders 74 on the spindle 72 may engage the inner surface of respective side plates 24' to maintain spacing of the side plates 24'. Alternatively, the side plates 24' may include a notch 66 instead of or in addition to the spindle 72. The notch 66 may reduce the surface of the side plate 24' in the area where pinching may occur.

To connect the assembly 10 to conveying equipment 12, such as a wheelchair, the front wheels of the conveying equipment are removed. In one embodiment, the front wheels of the conveying equipment are removed from between a pair of forks 20 in a fork assembly 18 that is connected to a shaft 14. The shaft 14 is rotatably disposed in the receiver 16 of the conveying equipment. The assembly 10 is positioned between the forks 20 such that the frame connecting openings 28 align with the holes in the forks 22. An axle 30, such as a bolt, clevis pin or the like, is inserted through the hole 22 in one fork 20, through the bearing 60 on side plate 24, 24', though the frame connection openings 28 in the side plates 24, 24', through the bearing 60 in the other side plate 24, 24' and through the hole 22 in the other fork 20, 24. It will be appreciated that in other implementations, the conveying equipment may not contain a pair of forks 20 maintaining a front wheel. In such a case, the fork assembly 18 including a shaft may have to be provided to rotatably connect the assembly 10 with the conveying equipment 12. Similarly, the conveying equipment may need to have a receiver 16 connected thereto in order to attach the assembly 10 to the conveying equipment 12.

In operation, the assembly 10 is rotatably connected to the conveying equipment 12. As the conveying equipment 12 is moved, the continuous track 52 rotates about the support wheels 32. If the assembly 10 encounters an impediment, such as for example a rock or a rut, the continuous track 52 will continue to rotate to help the conveying equipment 12 move past the obstacle. In some instances, the assembly 10 may pivot about the axle 30 such that a larger portion of the continuous track 52 will engage the ground. The use of a continuous track 52 as described may help inhibit the conveying equipment 12 from suddenly stopping or tipping over. The continuous track 52 may rotate in a forward or a rearward direction, allowing the conveying equipment 12 to go forward or backward. In embodiment as shown, the continuous track 52 and support wheels 32 are symmetrical from front to back, so movement of the conveying equipment 12 in either the forward or rearward direction will have the same effect on the assembly, except that the direction of the movement of the continuous track 52 may be reversed. Further, during normal movement of the conveying equipment 12, a relatively smaller amount of the continuous track 52, immediately about the apex of the V-shape, contacts the surface on which the conveying equipment 12 is being used. This may allow for relatively easy turning of the assembly 10 relative to the conveying equipment 12 to thereby help turn the conveying equipment.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the term "for example," "and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A continuous track attachment assembly adapted to be used on conveying equipment comprising:
   a pair of spaced apart side plates having a plurality of wheel mounting openings therethrough, the side plates having a frame connection opening therethrough;
   a plurality of support wheels disposed between the side plates, each of the support wheels including a wheel axle receiving opening therethrough;
   an axle disposed through the wheel mounting openings of the side plate and through the wheel axle receiving openings of the support wheels to thereby support the support wheels between the side plates while allowing rotation of the support wheels;
   a spindle having a shoulder, and wherein at least one of the side plates incudes a pocket having a bearing disposed in the pocket, the spindle at least partly received in an opening of the bearing, and the shoulder engaging the side plate; and a continuous track disposed about the support wheels.

2. An assembly as set forth in claim 1 wherein the plurality of support wheels comprises a center wheel having a center wheel periphery defining a center wheel outer diameter, and first and second wheels each having a periphery defining an outer diameter, the center wheel outer diameter is greater than the outer diameters of the first and second support wheels.

3. An assembly as set forth in claim 2 wherein the outer diameter of the first wheel is the same as the outer diameter of the second wheel.

4. An assembly as set forth in claim 2 wherein the continuous track forms a V-shape when disposed about the support wheels, having at least an apex below the center wheel.

5. An assembly as set forth in claim 4 wherein each of the support wheels includes a wheel bearing receiving pocket.

6. An assembly as set forth in claim 5 wherein each of the support wheels includes a bearing disposed in the wheel bearing receiving pocket, the bearing including an opening therethrough.

7. An assembly as set forth in claim 6 wherein the frame connection openings are adapted to receive an axle therethrough.

8. An assembly as set forth in claim 6 wherein each side plate includes a boss defining a bearing receiving pocket for receiving a bearing and a boss opening.

9. An assembly as set forth in claim 2 wherein the continuous track has an inner portion having a plurality of teeth and an outer portion having a tread.

10. An assembly as set forth in claim 9 wherein the assembly is connected with coupled to the conveying equipment.

11. An assembly as set forth in claim 1 wherein each of the side plates includes a spacer, the spacers engaging each other to inhibit flexing of the side plates.

12. An assembly as set forth in claim 1 wherein at least one of the side plates includes a notch.

13. An assembly as set forth in claim 1 wherein the spindle has a pair of shoulders, and wherein each of the side plates incudes a pocket having a bearing disposed in the pocket, the spindle at least partly received of the bearings, and each shoulder engages a respective side plate.

* * * * *